US007773663B2

(12) United States Patent
Watanabe

(10) Patent No.: US 7,773,663 B2
(45) Date of Patent: Aug. 10, 2010

(54) COMMUNICATION APPARATUS, COMMUNICATION METHOD, AND PROGRAM

(75) Inventor: Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1024 days.

(21) Appl. No.: 11/132,278

(22) Filed: May 19, 2005

(65) Prior Publication Data

US 2005/0265434 A1 Dec. 1, 2005

(30) Foreign Application Priority Data

May 28, 2004 (JP) ............................ 2004-158468

(51) Int. Cl.
H04B 1/00 (2006.01)
(52) U.S. Cl. .................. 375/150; 375/130; 375/147; 375/140; 455/63.1
(58) Field of Classification Search ............ 375/140, 375/130, 147, 149, 150, 152
See application file for complete search history.

(56) References Cited

U.S. PATENT DOCUMENTS

| | | | | |
|---|---|---|---|---|
| 6,580,748 | B1* | 6/2003 | Muraoka | 375/141 |
| 6,771,986 | B1* | 8/2004 | Oh | 455/562.1 |
| 7,030,227 | B1* | 4/2006 | McKeon et al. | 530/387.9 |
| 7,031,371 | B1* | 4/2006 | Lakkis | 375/146 |
| 7,386,063 | B1* | 6/2008 | Husted | 375/316 |
| 2003/0137964 | A1* | 7/2003 | Suenaga et al. | 370/342 |
| 2004/0001554 | A1* | 1/2004 | Sun et al. | 375/260 |
| 2004/0008617 | A1* | 1/2004 | Dabak et al. | 370/208 |
| 2004/0053621 | A1* | 3/2004 | Sugaya | 455/450 |
| 2004/0151109 | A1* | 8/2004 | Batra et al. | 370/208 |
| 2004/0170157 | A1* | 9/2004 | Kim et al. | 370/349 |
| 2004/0170217 | A1* | 9/2004 | Ho | 375/134 |
| 2004/0240597 | A1* | 12/2004 | Cattaneo et al. | 375/354 |
| 2004/0264425 | A1* | 12/2004 | Nishikawa | 370/338 |
| 2005/0013387 | A1* | 1/2005 | Ojard | 375/316 |
| 2005/0018750 | A1* | 1/2005 | Foerster et al. | 375/130 |

(Continued)

FOREIGN PATENT DOCUMENTS

JP 2000-82974 3/2000

(Continued)

OTHER PUBLICATIONS

Reed Fisher, et al., "[Merger#2 Proposal DS-CDMA]", Project: IEEE P802.15 Working Group for Wireless Personal Area Networks (WPANs), doc.: IEEE 802.15-03/334r5, Communications Research Laboratory (CRL) & CRL-UWB Consortium, Nov. 2003, slides 1, 7, 24-35, 37, 38, 42 and 71.

Primary Examiner—Shuwang Liu
Assistant Examiner—Kenneth Lam
(74) Attorney, Agent, or Firm—Oblon, Spivak, McClelland, Maier & Neustadt, L.L.P.

(57) ABSTRACT

A communication apparatus including: a despreading section despreading a reception signal with a spreading code defined in one communication system; a decoding section decoding the reception signal despread by the despreading section; and a first occupation detection section correlatively detecting an occupation state of a communication band with a preamble code defined in the communication system; and a second occupation detection section correlatively detecting an occupation state of a communication band of a signal of another communication system, the signal being expected to arrive as an interference wave, with a preamble code defined in the another communication system.

15 Claims, 15 Drawing Sheets

U.S. PATENT DOCUMENTS

| | | | |
|---|---|---|---|
| 2005/0105505 A1* | 5/2005 | Fishler et al. | 370/349 |
| 2005/0147112 A1* | 7/2005 | Sugaya | 370/418 |
| 2005/0152327 A1* | 7/2005 | Erlich et al. | 370/343 |
| 2005/0163094 A1* | 7/2005 | Okada et al. | 370/343 |
| 2005/0180489 A1* | 8/2005 | Tamaki | 375/130 |
| 2005/0266808 A1* | 12/2005 | Reunamaki et al. | 455/101 |

FOREIGN PATENT DOCUMENTS

| | | |
|---|---|---|
| JP | 2001-237847 | 8/2001 |
| JP | 2001-313623 | 11/2001 |
| JP | 2003-18119 | 1/2003 |

* cited by examiner

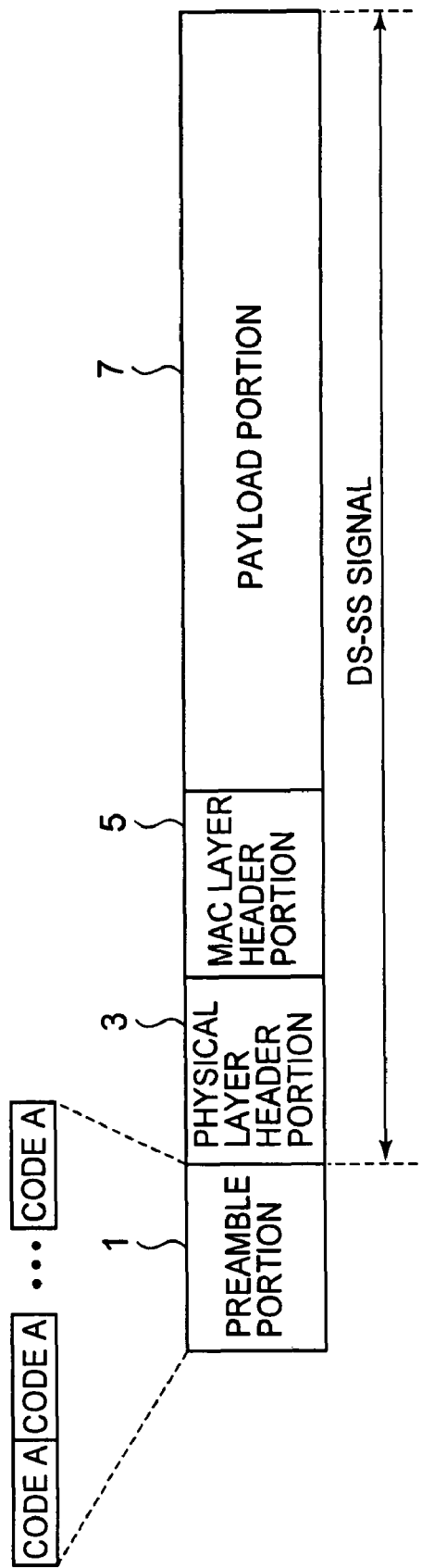
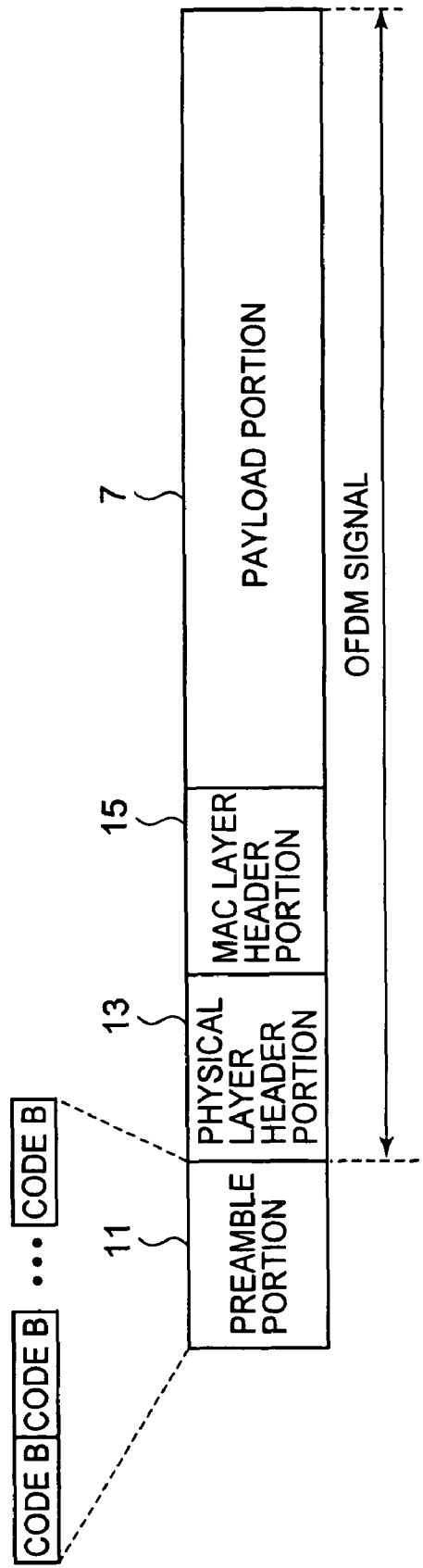

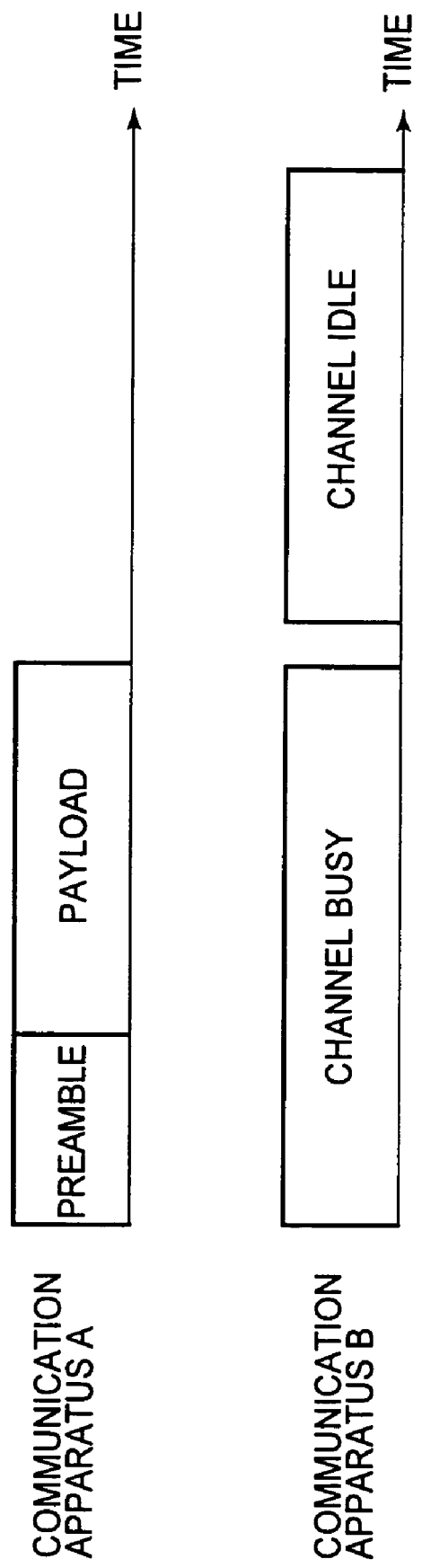

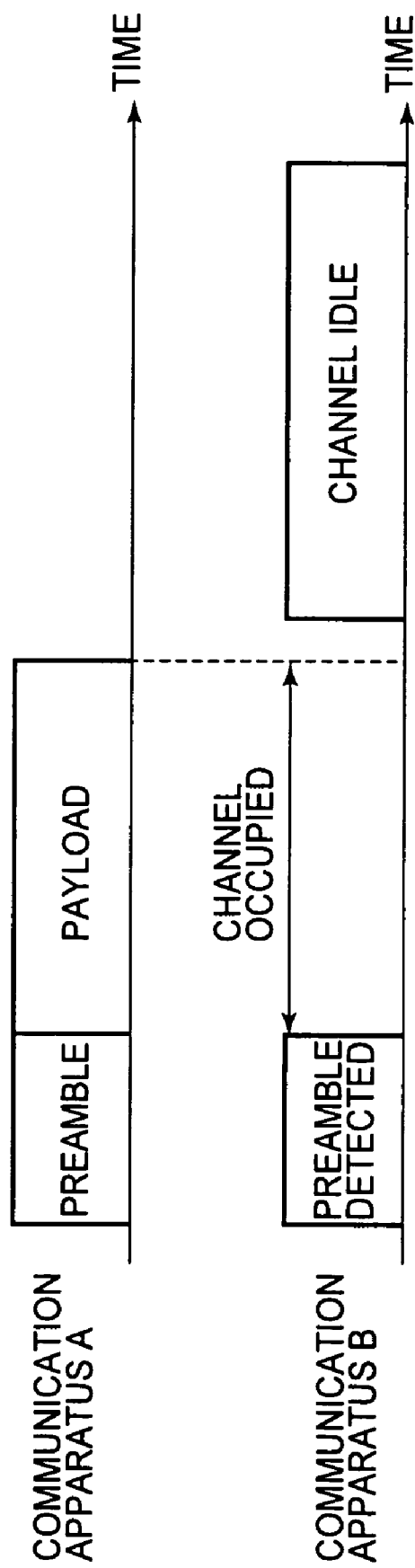

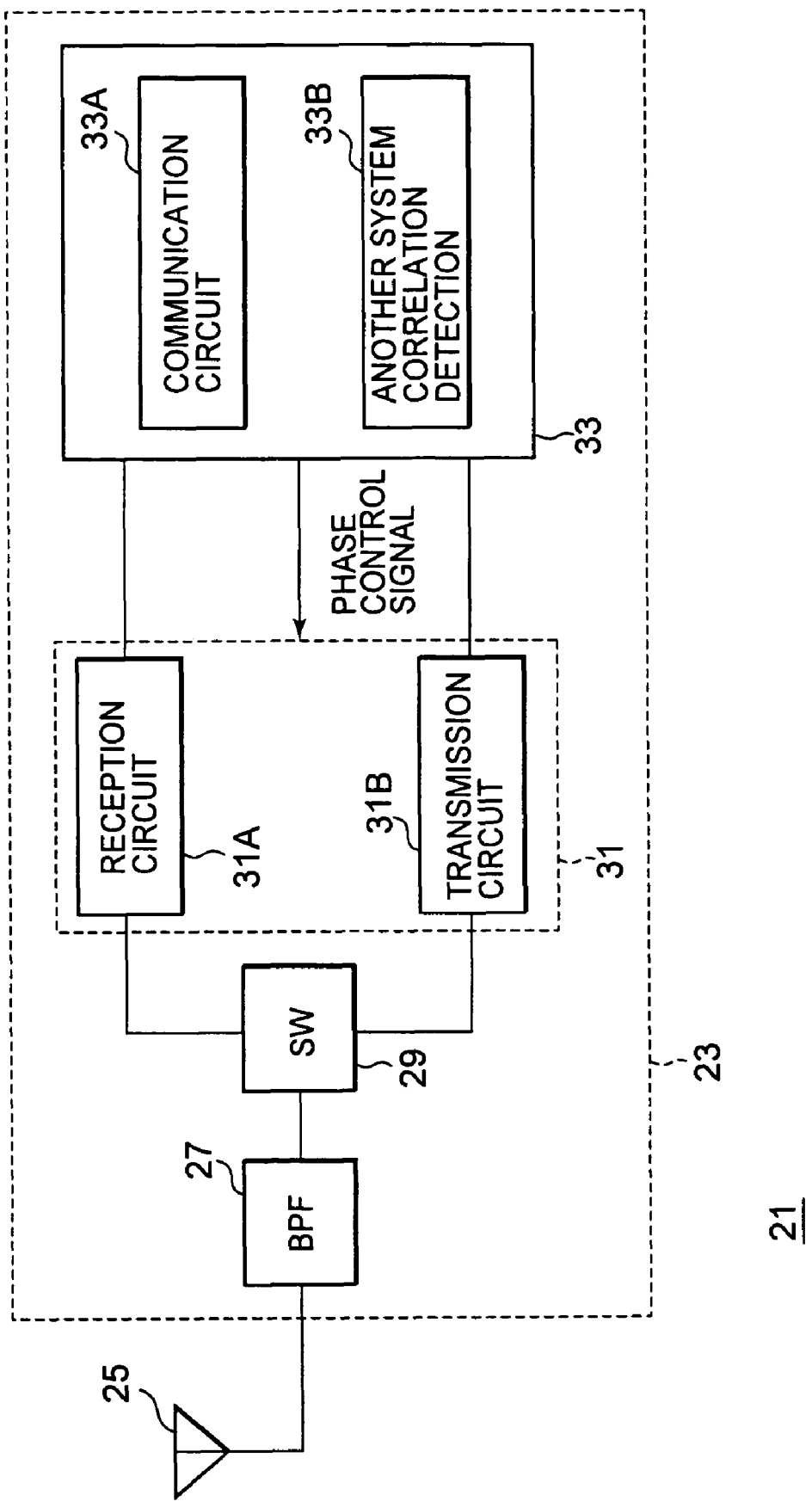

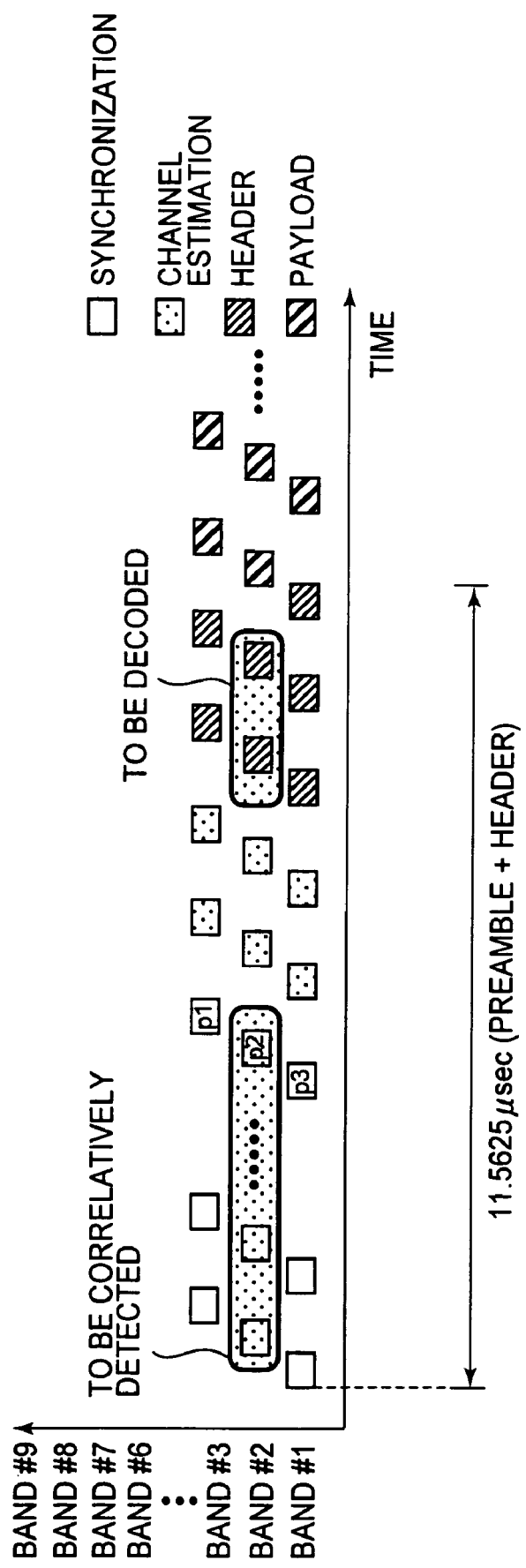

COMMUNICATION APPARATUS, COMMUNICATION METHOD, AND PROGRAM

CROSS REFERENCE TO RELATED APPLICATIONS

The present invention contains subject matter related to Japanese Patent Application JP2004-158468, filed in the Japanese Patent Office on May 28, 2004, the entire contents of which being incorporated herein by reference.

BACKGROUND OF THE INVENTION

1. Field of the Invention

The present invention relates to a communication apparatus that uses a spread coding system for a communication system, a communication method of the communication apparatus, and a program that is; executed by a computer mounted on a communication apparatus.

2. Description of Related Art

As a radio communication system, the ultra wide band (UWB) communication system is known. The ultra wide band communication system has attracted attention as a technique that can transmit very short pulses having a period of 1 nanosecond or less, namely at a very high speed of 100 Mbps or more. Since transmission pulses of the ultra wide band communication system are very short, it is known that one pulse has a very large bandwidth of around several GHz on the frequency axis. Thus, the FCC (Federal Communications Commission) of the United States prescribes a spectrum mask for an ultra wide band communication. This provision limits the band for ultra wide band communication system to a range from 3.1 GHz to 10.6 GHz. The provision also states output levels that are limited to room environments. At present, the standardization committee for IEEE 802.15.3a is studying two ultra wide band communication systems. These systems are multi-band orthogonal frequency division multiplex (MB-OFDM) and direct sequence spread spectrum (DS-SS). Each of these systems uses a plurality of sub bands into which a band designated by the FCC is divided. Technical information of the related art of the present patent application is as follows:

[Non-patent document 1] AnujBatara, "15-03-0268-04-003a-Multiband-OFDM-CFP-Document-v0.doc," [online], Internet <URL: http://www.multibandofdm.org/ieee_proposal_spec.html, March 2004>

[Non-patent document 2] Reed Fisher, Ryuji Kohno, et. al., "15-04-0137-01-003a-merger2-proposal-ds-uwb-update.doc", [online], March 2004, Internet <URL: ftp://ieee:wireless@ftp.802wirelessworld.com/15/04/15-04-0137-01-003a-merger2-proposal-ds-uwb-update.doc>

At present, there are possibilities of which both the systems will be standardized. However, if different physical layers coexisted, they would interfere with each other and disturb communications. This technical problem would occur between other communication standards besides IEEE 802.15.3a.

SUMMARY OF THE INVENTION

In view of the foregoing, it would be desirable to provide a communication method that has (a) a despread process that despreads a reception signal with a spreading code defined in one communication system, (b) a decoding process that decodes the reception signal that has been despread by a despread section, (c) a first occupation detection process that correlatively detects an occupation state of a communication band with a preamble code defined in the communication system, and (d) a second occupation detection process that correlatively detects an occupation state of a communication band of a signal of another communication system, the signal being expected to arrive as an interference wave, with a preamble code defined in the another communication system. The first occupation detection process detects that an occupation of the communication band occupied by another station that uses the same communication system as a local station. On the other hand, the second occupation detection process detects that an occupation of the communication band occupied by another station that uses a different communication system from the local station.

In the communication method according to an embodiment of the present invention, even if two communication systems that interfere with each other are used in the same space, at least one of the communication systems can detect that the occupation state of the communication band occupied by another communication system.

Other principle features and advantages of the present invention will become apparent to those skilled in the art upon review of the following drawing, the detailed description, and the appended claims.

BRIEF DESCRIPTION OF THE DRAWINGS

The invention will become more fully understood from the following detailed description, taken in conjunction with the accompanying drawing, wherein like reference numerals denote like elements, in which:

FIG. 5A and FIG. 5B are schematic diagrams showing frame formats of the DS-SS system and the MB-OFDM system, respectively;

FIG. 6 is a schematic diagram showing a principle of the carrier sense system;

FIG. 7 is a schematic diagram showing a principle of the carrier sense system on the basis of a correlative reception;

FIG. 8 is a block diagram showing the overall structure of a communication apparatus;

FIG. 17 is a schematic diagram showing symbols that can be detected by correlation detection.

DESCRIPTION OF THE EMBODIMENTS

Next, a communication apparatus that uses a communication method according to an embodiment of the present invention will be described. Portions that are not illustrated and/or described in this specification apply to known techniques in the field of the present invention.

(1) Communication Systems

Next, as examples of the ultra wide band communication systems, the DS-SS system and the MB-OFDM system will be described. The DS-SS system is a communication system of which one of a plurality of sub bands that has been divided and allocated in a transmission band is used as a communication band.

(1-1) MB-OFDM System

Figure 1:
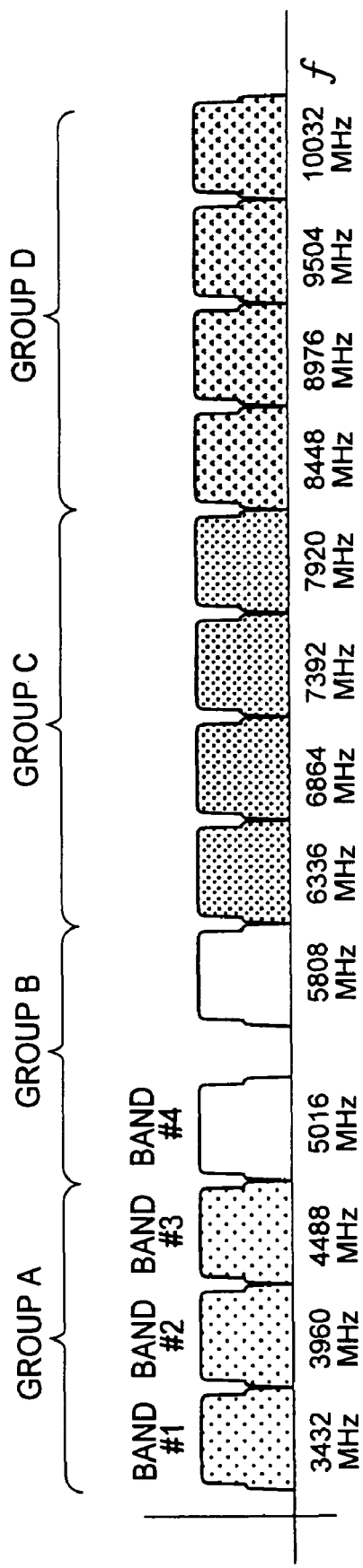
FIG. 1 is a schematic diagram showing a frequency allocation of the MB-OFDM system.
Figure 2:
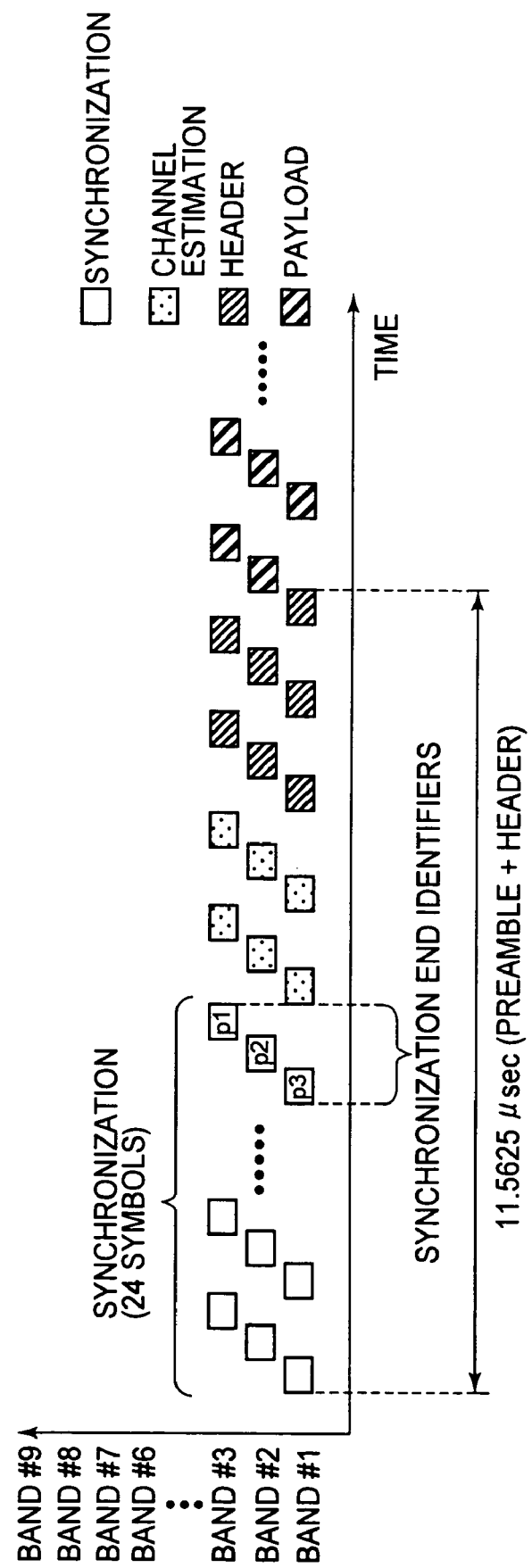
FIG. 2 is a schematic diagram showing an example of hopped frequencies in the MB-OFDM system.

FIG. 1 shows an example of a frequency allocation of the MB-OFDM system. In FIG. 1, the whole band is divided into 13 sub bands. The whole band ranges from 3.1 GHz to 10.6 GHz except for 5 GHz sub bands. One sub band is allocated a bandwidth of 528 MHz. In FIG. 1, the sub bands are designated by bands #1, #2, #3, . . . , and #13 in the order from the lowest frequency to the highest frequency. The bands #1 to #3 are called group A; the bands #4 and #5 are called group B; the bands #6 to 39 are called group C; and the bands #10 to #13 are called group D. In this communication system, one communication session is accomplished with a plurality of sub bands of one group. In other words, a communication is performed by frequency hopping a plurality of sub bands of the same group. FIG. 2 shows the frequency hopping used in the MB-OFDM system. FIG. 2 shows an example of the frequency hopping of the group A. In FIG. 2, the bands #1, #2, and #3 are cyclically used. The first 24 symbols are used for synchronization. The next six symbols are used for estimating a channel. The next seven symbols are used for a header. The other symbols are used for a payload.

(1-2) DS-SS System

Figure 3:
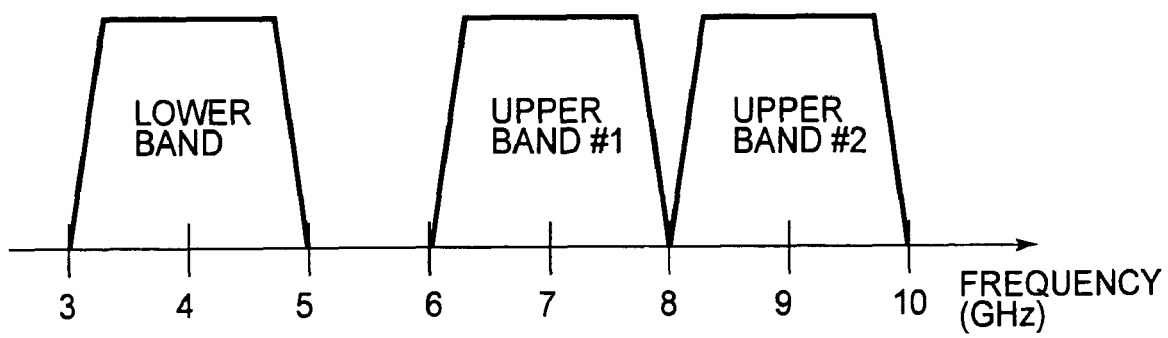
FIG. 3 is an example of a frequency allocation of the DS-SS system.
Figure 4:
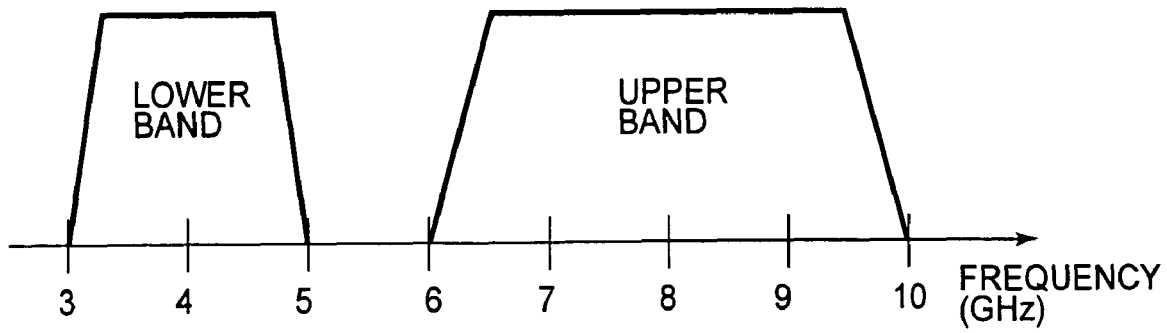
FIG. 4 is an example of a frequency allocation of the DS-SS system.

FIG. 3 and FIG. 4 show examples of frequency allocations of the DS-SS system. In this case, the whole band ranges from 3.1 GHz to 10.6 GHz except for a 5 GHz band. In this example, the 5 GHz band ranges from 4.9 GHz to 5.85 GHz. In this embodiment, a band lower than the 5 GHz band is referred to as the lower band and a band higher than the 5 GHz band is referred to as the upper band. FIG. 3 is an example of a frequency allocation of which the whole band is divided into three portions. In FIG. 3, the bandwidths of the three sub bands are the same. Thus, by changing the center frequency of one sub band, the current frequency channel can be changed to another channel. FIG. 4 shows an example of a frequency allocation of which the whole band is divided into two portions. In FIG. 4, the bandwidth of the upper band is twice as large as that of the lower band. In other words, with the upper band, data can be transmitted at higher speed than with the lower band. In this frequency allocation, by doubling the center frequency of the lower band and the clock frequency of the entire circuit, the current frequency channel can be changed to another channel. In Japan, in the 5 GHz band, frequencies from 4.9 GHz to 5.0 GHz and frequencies from 5.03 GHz to 5.06 GHz can be used.

(2) Correlation Carrier Sense

First of all, frame formats used in those communication systems will be described. FIG. 5A shows a radio frame format of the DS-SS system. FIG. 5B shows a radio frame format of the MB-OFDM system. The frame formats of these communication systems are basically the same. The frames of these communication systems have a preamble portion 1 (11), a physical layer header portion 3 (13), a MAC layer header portion 5 (15), and a payload portion 7 (17), where reference numerals in parentheses are for the MB-OFDM system. These portions except for the preamble portion are modulated on the basis of the communication systems. In other words, the physical layer header portion, the MAC layer header portion, and data of the payload portion of a communication wave that is received need to be demodulated on the basis of these communication systems. On the other hand, the preamble portion that represents that a communication wave starts is composed of a plurality of predetermined identical codes (preamble codes) In FIG. 5A, codes that are repeated in the preamble portion 1 of the DS-SS system are code A. In FIG. 5B, codes that are repeated in the preamble portion 1 of the MB-OFDM system are code B. The code A is different from the code B.

Since the signal level of the preamble portion of the reception signal of the ultra wide band communication system is very small, the system is unable to use the carrier sense system typically used. The carrier sense system typically used is a method that squares the reception signal and filters the squared value to detect the signal. FIG. 6 shows an example of a detecting operation of which the square type carrier sense system is applied to the wide band communication system. FIG. 6 shows that while a communication apparatus A is transmitting a communication signal, a communication apparatus B outputs a channel busy signal. In other words, the preamble portion and the payload portion can obtain the channel busy signal. However, in the ultra wide band communication system, even if a reception signal is squared, a sufficient reception sensitivity is unable to be obtained. Thus, in the ultra wide band communication system, the preamble portion 1 is detected by correlative reception. When the preamble portion 1 is detected by the correlative reception, since a gain corresponding to the length of a code is obtained, a carrier can be sensed.

FIG. 7 shows an example of a detecting operation of which a correlation type carrier sense system is applied to the ultra wide band communication system. FIG. 7 shows that the communication apparatus B correlatively detects the preamble portion 1 of the communication signal that the communication apparatus A has transmitted. In other words, although the communication apparatus B detects only the preamble portion 1 at the beginning of the frame, the communication apparatus B can expect that the channel of the packet is busy. The correlation detection can be applied to both the preamble portion 1 of the DS-SS system and the preamble portion 11 of the MB-OFDM system. Thus, it is conceivable that when predetermined communication conditions are satisfied, the preamble portion can be correlatively received regardless of the communication systems. There are three communication conditions with respect to the correlative detection: the center frequency of the communication band, the pattern of the preamble portion (preamble codes), and the symbol rate (symbol length).

(3) Communication Apparatus

Next, an example of a communication apparatus of the DS-SS system will be described. It is preferred that the communication apparatus according to the embodiment is a communication apparatus of the MB-OFDM system that uses the same communication band as the local station.

(3-1) First Embodiment

(a) Overall Structure

FIG. 8 shows an example of the structure of a communication apparatus 21 of the DS-SS system. The communication apparatus 21 has a function that detects the preamble portion of a signal of the MB-OFDM system. The communication apparatus 21 has a main body 23, an antenna 25, a band pass filter 27, a switch 29, an RF circuit 31 (that has a reception circuit 31A and a transmission circuit 31B), and a base band circuit 33. Most of these circuits are known circuits. The RF circuit 31 uses, for example, QPSK, BPSK, or π/2 shift BPSK as a primary modulation method. In this case, it is assumed that the chip rate is what the carrier frequency is divided by any integer. The pass band of the band pass filter 27 is set to either of two communication bands and three communication bands allocated for the DS-SS system. A characteristic portion of this embodiment is a correlation detection circuit 33B that correlatively detects a communication system employed by another station (hereinafter it is called "another system correlation detection circuit"). The another system is the MB-OFDM system. The another system correlation detection circuit 33B is disposed in the base band circuit 33. A DS-SS system communication circuit 33A is also disposed in the base band circuit 33.

(b) Structure of Base Band Circuit

Figure 9:
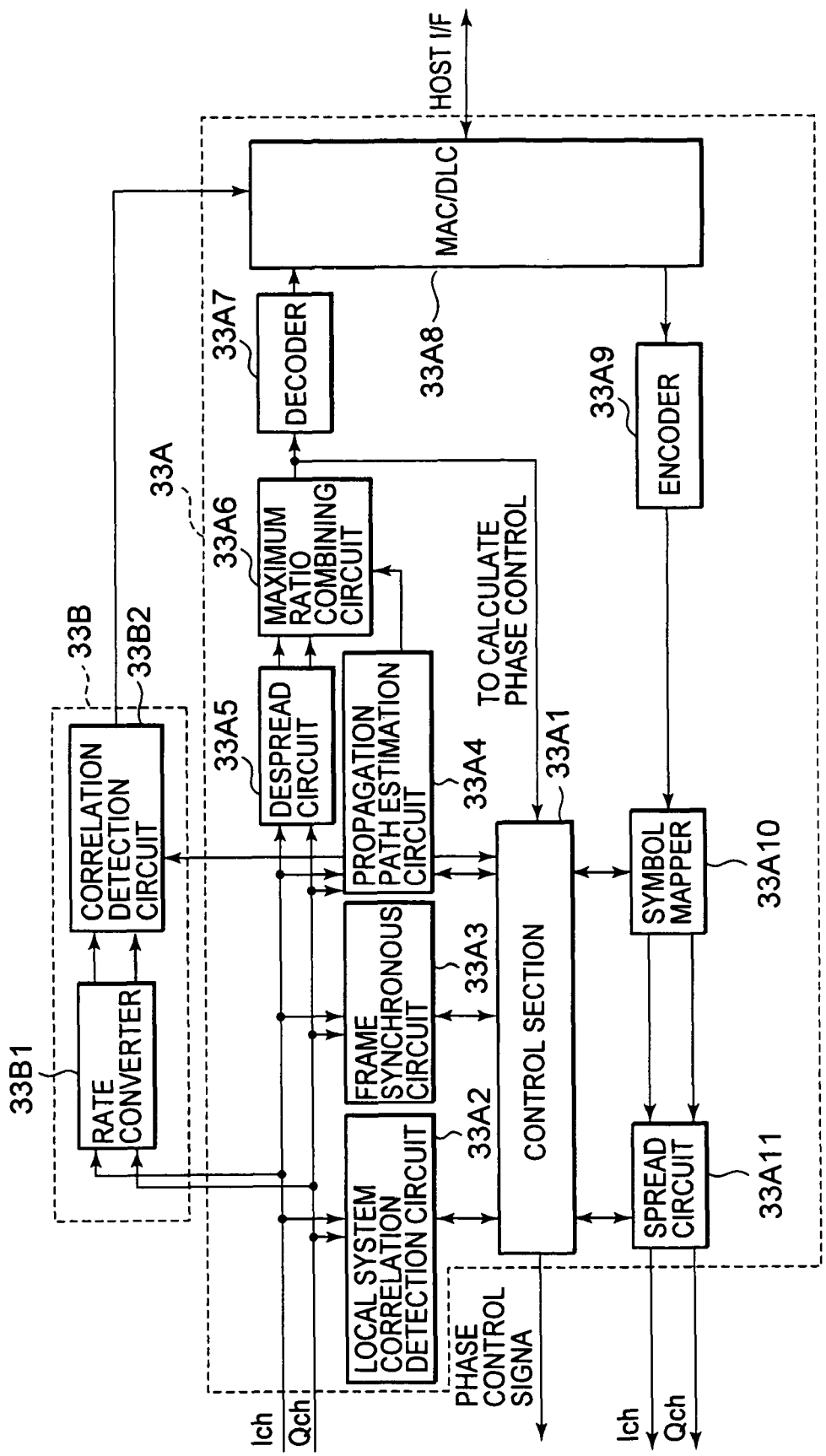
FIG. 9 is a block diagram showing a base band circuit according to an embodiment of the present invention.

FIG. 9 shows the base band circuit 33 according to the embodiment of the present invention. FIG. 9 shows a structure of which the center frequency (FIG. 3 and FIG. 4) of the lower band of the DS-SS system is set to the center frequency of the second lowest band, the band #2, of the MB-OFDM system shown in FIG. 1. In other words, in FIG. 9, the center frequency of the lower band is set to 3960 MHz. It is assumed that the carrier frequency and the chip rate have a relationship of an integer ratio.

(b-1) Structure of Communication Circuit

First of all, the structure of the communication circuit 33A will be described. The communication circuit 33A has a control section 33A1, a correlation detection circuit 33A2 that correlatively detects a communication system employed by the local station (hereinafter it is called "local system correlation detection circuit"), a frame synchronous circuit 33A3, a propagation path estimation circuit 33A4, a despread circuit 33A5, a maximum ratio combining circuit 33A6, a decoder 33A7, an MAC/DLC circuit 33A8, an encoder 33A9, a symbol mapper 33A10, and a spread circuit 33A11. The control section 33A1 controls a sequence of a communication signal on time base. In addition, the control section 33A1 controls the oscillation frequency of a local oscillator disposed in the RF circuit 31. The control section 33A1 supplies a control signal as a phase control signal to the RF circuit 31. The control section 33A1 executes a calculation process necessary to control the phase of the communication signal. A signal necessary for the calculation is supplied from the maximum ratio combining circuit 33A6 to the control section 33A1. The local system correlation detection circuit 33A2 is a circuit that correlatively detects an occupation of a communication band occupied by another station that installs the same DS-SS system as the local station does.

Figure 10:
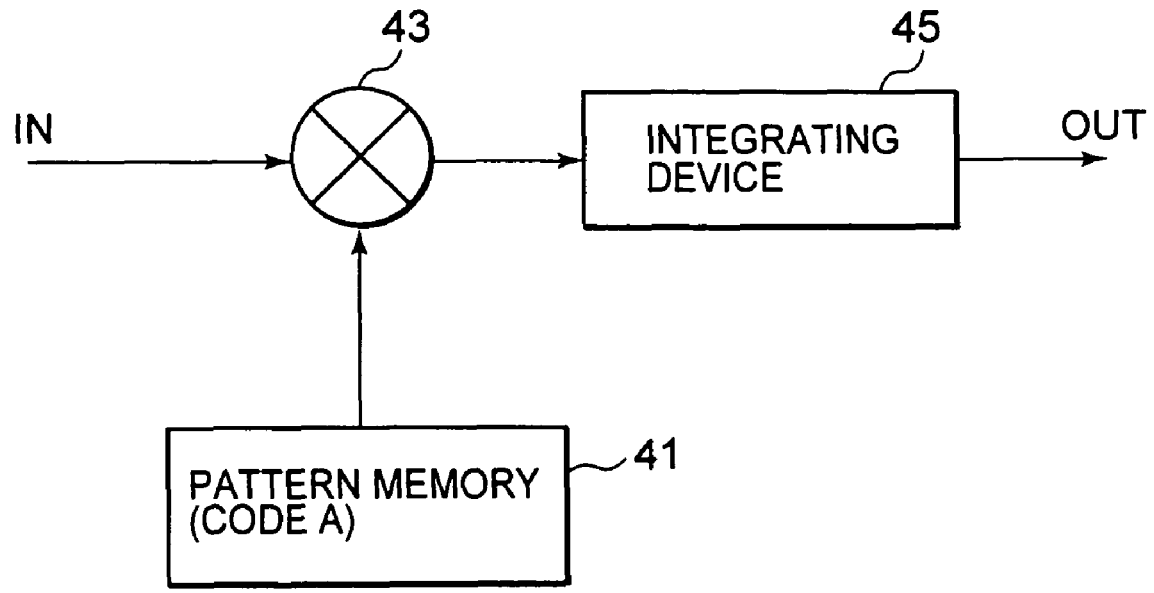
FIG. 10 is a schematic diagram showing a correlation detection circuit of the DS-SS system.

FIG. 10 shows a circuit structure of the local system correlation detection circuit 33A2. The local system correlation detection circuit 33A2 has a pattern memory 41, a multiplying device 43, and an integrating device 45. The pattern memory 41 stores the preamble code A unique to the DS-SS system. The multiplying device 43 multiplies the reception signal by the preamble code A. When the reception signal and the preamble code A are highly correlated, the multiplied result becomes a large value. The integrating device 45 is a circuit that cumulates the multiplied result. The frame synchronous circuit 33A3 is a circuit that synchronizes a frame after detecting the preamble portion 1. The propagation path estimation circuit 33A4 is a circuit that measures an impulse response of the radio transmission path. The despread circuit 33A5 is a circuit that despreads the reception signal after synchronizing the frame and estimating transmission path. The despread circuit 33A5 despreads the header portion and the payload portion. The maximum ratio combining circuit 33A6 is a circuit that combines the despread symbols and the impulse response at the maximum ratio. The decoder 33A7 decodes the reception pattern that has been combined at the maximum ratio to information. The MAC/DLC circuit 33A8 is a circuit that controls an access to a band and a data link. The detected result of the another system correlation detection circuit 33B is supplied to the MAC/DLC circuit 33A8. When an occupation of the band of the communication wave of the local station, which is expected to arrive as an interference wave, occupied by a communication wave of the other system has been detected, the MAC/DLC circuit 33A8 stops the communication operation of the local station. The stop period is at least one packet long. The encoder 33A9 is a circuit that encodes information. The symbol mapper 33A10 is a primary modulation circuit that converts encoded bits into transmission symbols. The spread circuit 33A11 is a secondary modulation circuit that spreads transmission symbols to an ultra wide band by the spread symbols.

(b-2) Structure of Another System Correlation Detection Circuit

Next, the structure of the another system correlation detection circuit 33B will be described. The another system correlation detection circuit 33B has a rate converter 33B1 and a correlation detection circuit 33B2. The rate converter 33B1 is a circuit that converts the symbol rate (symbol length) of the DS-SS system into a symbol rate of the MB-OFDM system. Specifically, the rate converter 33B1 thins out sampling values. The rate converter 33B1 is used because the chip rate of the DS-SS system is faster than the chip rate of the MB-OFDM system and the preamble portion of a signal of the MB-OFDM system is oversampled. FIG. 1, FIG. 3, and FIG. 4 show that the chip rate of the DS-SS system is different from the chip rate of the MB-OFDM system. The bandwidth of the lower band of the DS-SS system (FIG. 3 and FIG. 4) is much larger than the bandwidth of each band of the MB-OFDM system. This is because the chip rate of the DS-SS system is larger than the chip rate of the MB-OFDM system and a communication signal of the DS-SS system spreads to a wider band than that of the MB-OFDM system. The correlation detection circuit 33B2 is a circuit that detects the preamble portion 11 of a communication signal of the band #2 of the MB-OFDM system.

Figure 11:
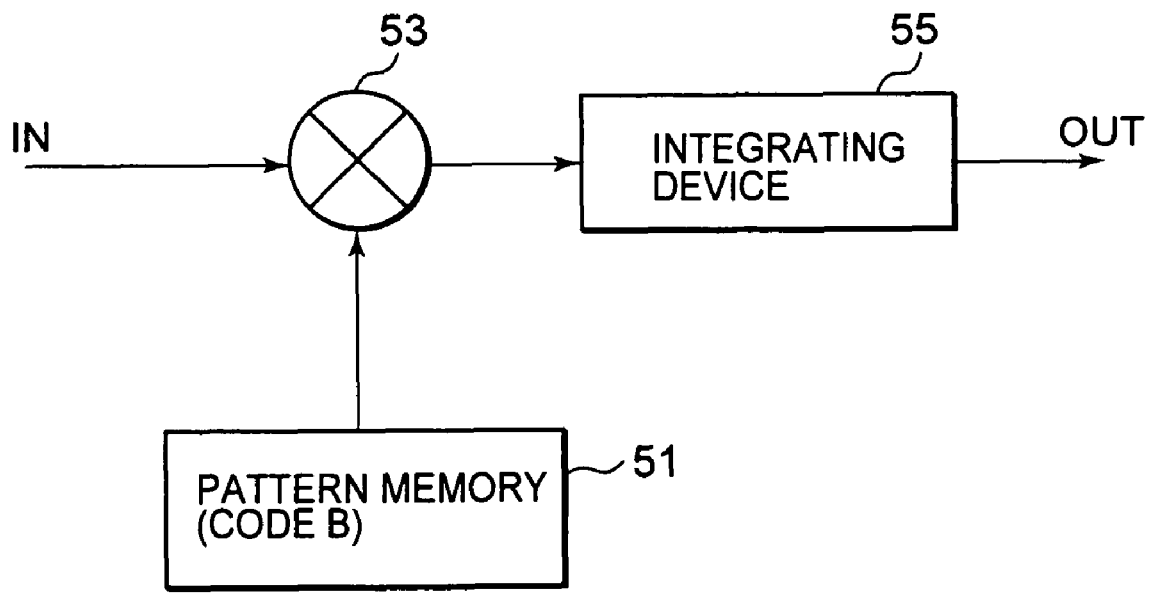
FIG. 11 is a schematic diagram showing a correlation detection circuit of the MB-OFDM system.

FIG. 11 shows the circuit structure of the correlation detection circuit 33B2. The correlation detection circuit 33B2 has a pattern memory 51, a multiplying device 53, and an integrating device 55. The pattern memory 51 stores the preamble code B unique to the MB-OFDM system. The preamble code B is set corresponding to a predetermined communication standard. The multiplying device 53 multiplies the reception signal by the preamble code B. When the reception signal and the preamble code B are highly correlated, the multiplied result becomes large value. The integrating device 55 is a circuit that cumulates the multiplied result. In this embodiment, the calculated result of the integrating device 55 is supplied to the MAC/DLC circuit 33A8 as a communication control section. When the integrated value exceeds a predetermined reference value, it means that a communication wave of the MB-OFDM system (namely, an interference wave) is occupying the communication band. On the other hand, when the integrated value does not exceed the predetermined reference value, it means that a communication wave of the MB-OFDM system (namely, an interference wave) is not occupying the communication band.

(3) Example of Use

Figure 12:
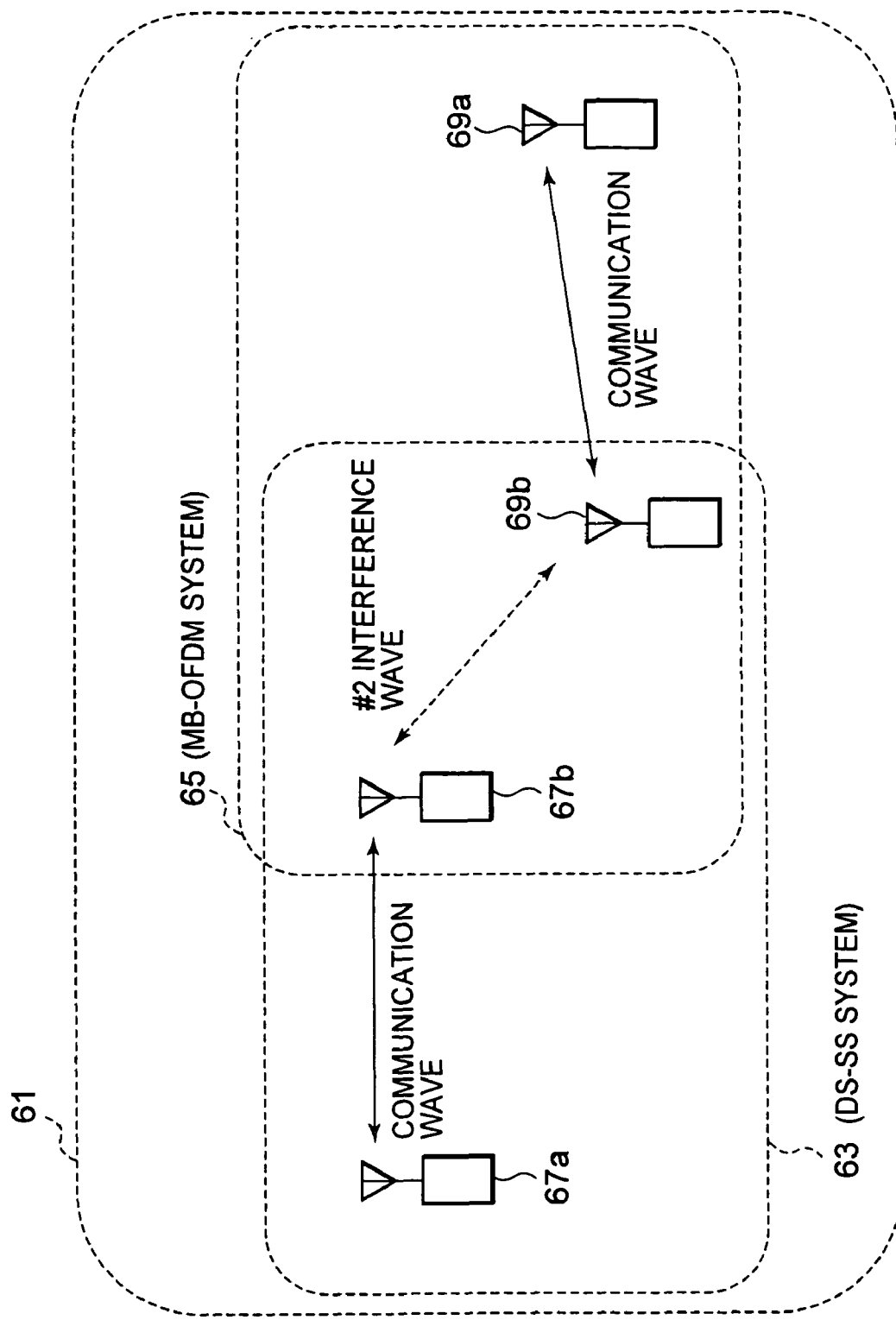
FIG. 12 is a schematic diagram showing an example of an operation of a radio communication system.

FIG. 12 shows an example of the use of the radio communication systems. FIG. 12 shows the state that two communication systems 63 and 65 co-exist in a communication area 61. An area in which the communication systems 63 and 65 overlap is an interference area. The communication system 63 corresponds to the DS-SS communication system. In the communication system 63, a communication apparatus 67a and a communication apparatus 67b communicate with each other using a lower band (having a center frequency of 3960 MHz). The communication system 65 corresponds to the MB-OFDM communication system. In the communication system 65, a communication apparatus 69a and a communication apparatus 69b communicate with each other using the bands #1 to #3 that are frequency hopped.

Figure 13:
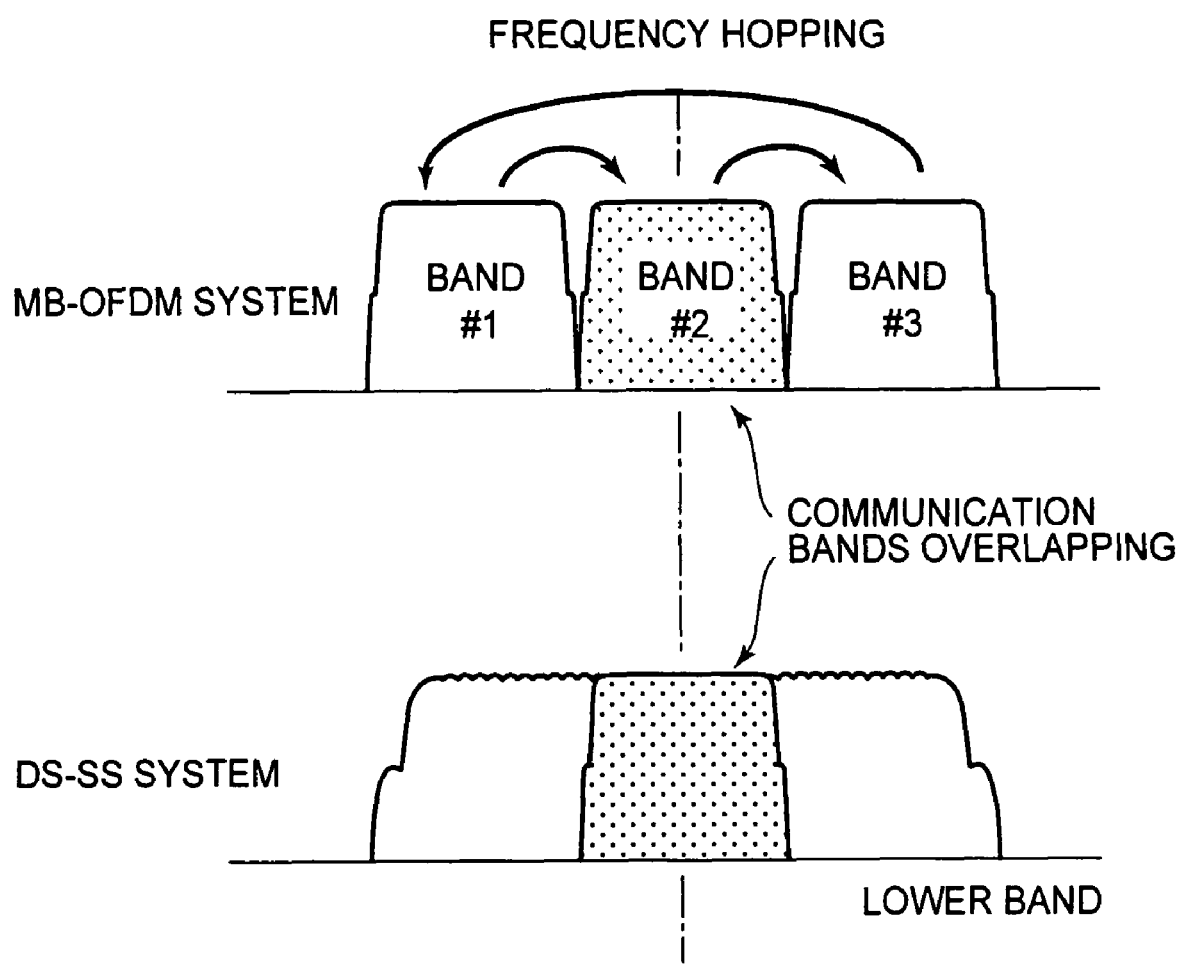
FIG. 13 is a schematic diagram showing a relationship of bands.
Figure 14:
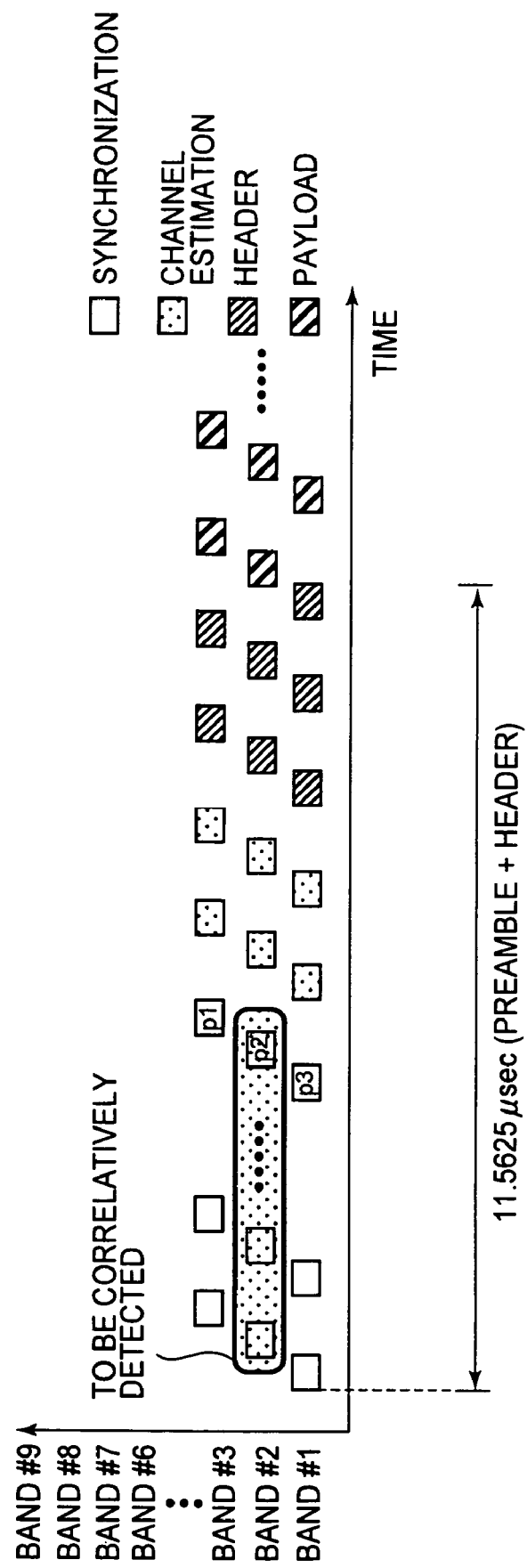
FIG. 14 is a schematic diagram showing symbols that can be correlatively detected.

FIG. 13 shows the communication state of the communication systems shown in FIG. 12. As shown in FIG. 13, a communication wave that the communication apparatus 69b of the MB-OFDM system outputs to the band #2 occupies the center of the band of the DS-SS system. The another system correlation detection circuit 33B disposed in the communication apparatus 67b of the DS-SS system correlatively detects that the communication wave occupies the center of the band. The occupation is correlatively detected by the another system correlation detection circuit 33B. Only the preamble portion 11 of the communication wave of the MB-OFDM system that uses the band #2 is correlatively detected, the preamble portion 11 being surrounded by a solid line shown in FIG. 14. The another system correlation detection circuit 33B are unable to correlatively detect the other symbols of the band #2. Likewise, the another system correlation detection circuit 33B is unable to correlatively detect symbols of a communication wave of the MB-OFDM system that uses the other bands #1 and #3. Of course, a communication wave of the MB-OFDM system that uses the bands #1 and #3 do not interfere with a communication wave of the DS-SS system. When the correlatively detected result represents that a communication wave of the MB-OFDM system has arrived, the communication apparatus 67b (MAC/DLC circuit 33A8) controls to stop transmitting or receiving a communication wave of the local station. At timing the another system correlation detecting circuit 33B does not correlatively detect an interference wave, the communication apparatus 67b restarts transmitting or receiving the communication wave of the local station. Thus, since the communication apparatus does not need to unnecessarily perform the retransmission control, the throughput of the communication apparatuses can be improved. Of course, the local system correlation detection circuit 33A2 always monitors whether the other communication apparatus 67a of the DS-SS system is occupying the communication band. When the local system correlation detection circuit 33A2 has detected the occupation of the communication band, the local system correlation detection circuit 33A2 controls the local station to stop transmitting the communication wave.

(d) Effects of the First Embodiment

Since the another system correlation detection circuit is disposed in the communication apparatus of the DS-SS system, the occupation state of a communication band occupied by a communication signal of the MB-OFDM system can be detected. In other words, it can be detected that a communication signal of the MB-OFDM system has arrived as an interference wave. On the basis of the detected result, the communication apparatus of the DS-SS system can stop transmitting or receiving the communication signal. Thus, the influence of the interference can be minimized.

For example, the another system correlation detecting circuit can stop receiving a communication signal that has been affected by an interference wave. In this case, the retransmission of the communication signal can be requested the timing at which it is not affected by the interference wave. In addition, the transmission process for a communication signal that is affected by an interference wave can be stopped. In this case, when the communication signal is transmitted at timing it is not affected by the interference wave, the retransmission process does not need to be unnecessarily performed. In other words, when there are two communication systems that interfere with each other in the same area, at least a communication apparatus of the DS-SS system can prevent a communication wave from interfering with a communication wave of a communication apparatus of the MB-OFDM system. As a result, the throughput of the communication systems can be improved.

(2-2) Second Embodiment (a) Structure of Base Band Circuit

Figure 15:
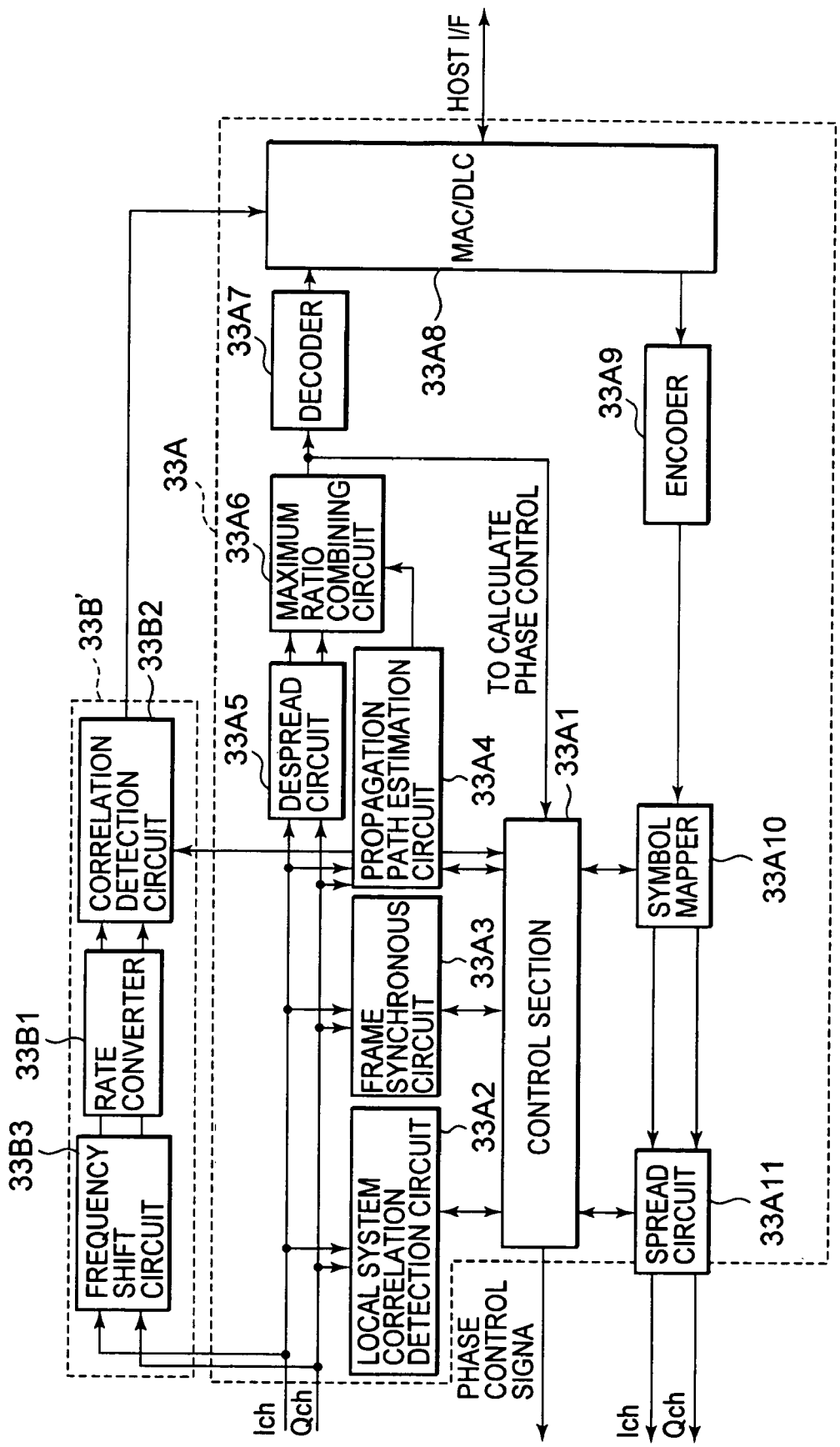
FIG. 15 is a block diagram showing a base band circuit according to another embodiment of the present invention.

In the foregoing embodiment, it is assumed that the center frequency of the lower band of the DS-SS system matches the center frequency of the second lowest band, the band #2, of the MB-OFDM. In contrast, in the second embodiment, it is assumed that the center frequencies of those two bands do not match. In this case, the deviation of the center frequencies of the two bands is within the range that two communication signals are interfered with each other. Next, only a portion of the second embodiment that is different from the first embodiment will be described. A characteristic portion of the second embodiment is an another system correlation detection circuit disposed in the base band circuit 33. In other words, the structures of the RF circuit 31 and the communication circuit 33A of the second embodiment are the same as those of the first embodiment. FIG. 15 shows the circuit structure of the base band circuit 33 including an another system correlation detection circuit 33B'. The circuit structure of the base band circuit 33 shown in FIG. 15 is the same as that shown in FIG. 9 except for the another system correlation detection circuit 33B'. Here, only the circuit structure of the another system correlation detection circuit 33B' will be described. The another system correlation detection circuit 33B' is the same as the another system correlation detection circuit 33B except that the former has a frequency shift circuit 33B3 disposed on an upstream stage of the rate converter 33B1. The frequency shift circuit 33B3 is a circuit that adjusts the deviation of the center frequencies. An adjusted sampling value is input to the rate converter 33B1. The circuit structures of the rate converter 33B1 and the correlation detection circuit 33B2 are the same.

Since the frequency shift circuit is disposed in the communication apparatus of the DS-SS system, even if the center frequency of the lower band of the DS-SS system does not match the center frequency of the second lowest band, the band #2, of the MB-OFDM system, it can be detected that a communication wave of the MB-OFDM system is occupying the communication band. As a result, since the influence of the interference of another communication system is minimized, the throughput of the systems can be improved.

(2-3) Third Embodiment

(a) Structure of Base Band Circuit

Figure 16:
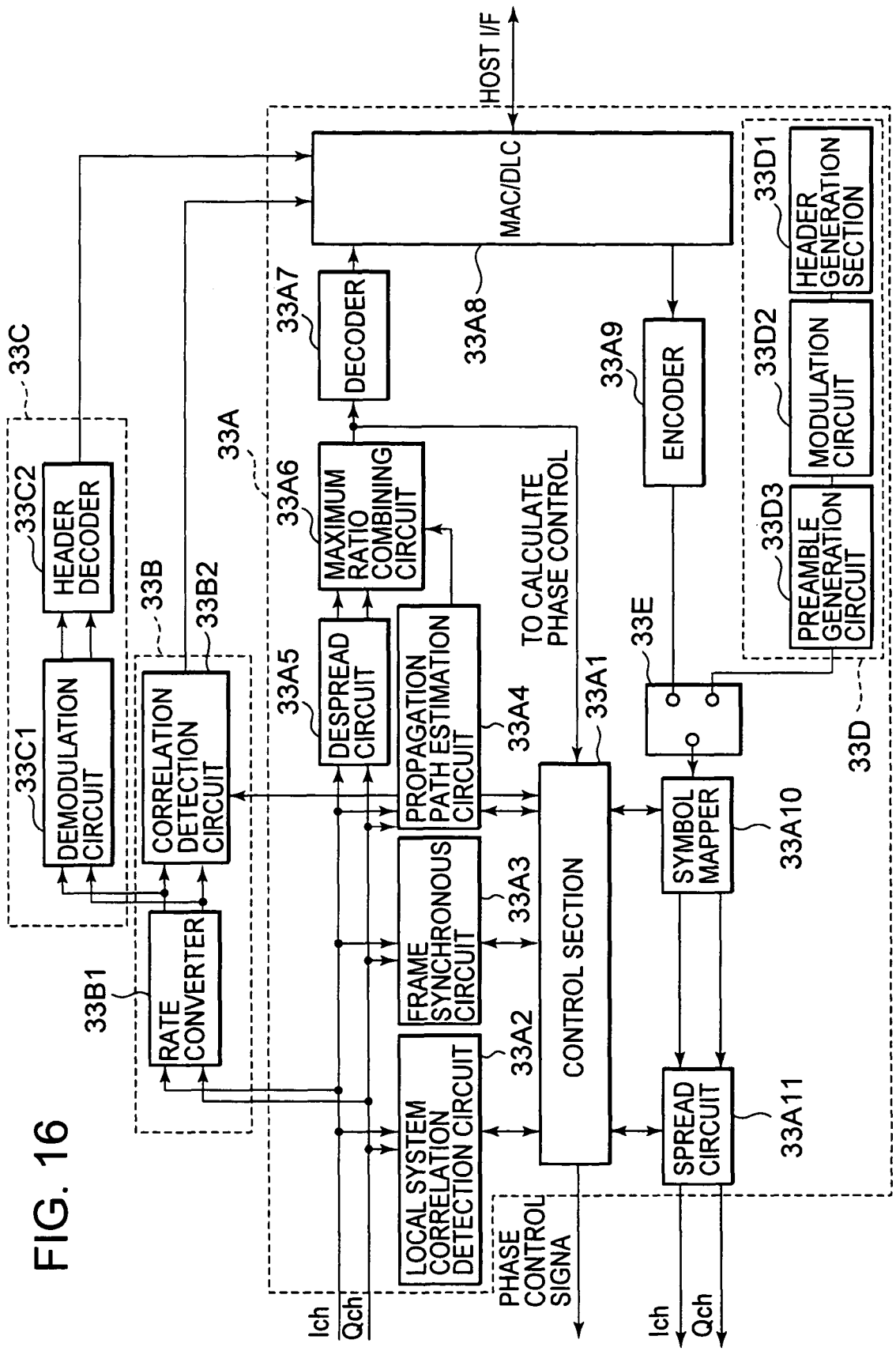
FIG. 16 is a block diagram showing a base band circuit according to another embodiment of the present invention.

Next, an extension example of the communication function will be described as a third embodiment of the present invention. In this embodiment, a case where a header transmission/reception function of the MB-OFDM system is disposed in a communication apparatus of the DS-SS system will be described. With reference to FIG. 16, only portions of the third embodiment that are different from the first embodiment will be described. Characteristic portions of the third embodiment are an another system header decode circuit 33C, an another system header transmission circuit 33D, and a switch 33E. Thus, the structures of the RF circuit 31, the communication circuit 33A, and the another system correlation detection circuit 33B of the third embodiment are the same as those of the first embodiment. In other words, it is assumed that the center frequency of the lower band of the DS-SS system matches the center frequency of the second lowest band, the band #2, of the MB-OFDM system.

The another system header decode circuit 33C has a demodulation circuit 33C1 and a header decoder 33C2. The demodulation circuit 33C1 is a circuit corresponding to the modulation system of the MB-OFDM system. In the third embodiment, the fast fourier transform (FFT) is used. The header decoder 33C2 is a circuit that decodes header information from a received pattern that has been demodulated. Of course, the header decoder 33C2 is unable to decode information of all the bands #1 to #3. However, the header decoder 33C2 can decode only header information of the band #2 of which the center frequencies of those bands match.

On the other hand, the another system header transmission circuit 33D has a header generation section 33D1, a modulation circuit 33D2, and a preamble generation circuit 33D3. The header generation section 33D1 is a circuit that generates headers of a communication signal of the MB-OFDM system. The headers are the physical layer header section 13 and the MAC layer header section 15. The modulation circuit 33D2 is a circuit corresponding to the modulation system, the MB-OFDM system. In the third embodiment, an inverse fast fourier transform (IFFT) circuit is used. The preamble generation circuit 33D3 is a circuit that adds a preamble pattern to the header.

The switch 33E is used to selectively output a signal that is input from the encoder 33A9 and a signal that is input from the another system header transmission circuit 33D. When a communication signal of the DS-SS system is transmitted, the switch 33E is connected to the encoder 33A9. When a communication signal of the MB-OFDM system (actually with a fixed band (in this example, the band #2)), the switch 33E is connected to the preamble generation circuit 33D3 so that the preamble portion 11 and the headers 13 and 15 are generated. In FIG. 17, symbols that can be transmitted and received by the foregoing circuit structure are shown by surrounding with a solid line box. Thus, although a communication apparatus of the DS-SS system can transmit and receive the preamble portion 11 and the headers 13 and 15 of a communication signal of the MB-OFDM system.

(b) Effect of the Third Embodiment

As described above, when the another system header decode circuit 33C is disposed in the communication apparatus 21, the communication apparatus 21 can distinguish a communication apparatus of the MB-OFDM system. In addition, when the another system header transmission circuit 33D is disposed in the communication apparatus 21, the communication apparatus 21 of the DS-SS system can transmit the preamble portion and the headers of a communication signal of the MB-OFDM system. Thus, when communication apparatuses of the MB-OFDM system and the DS-SS system coexist in the same area, the former can be informed that the latter exists. However, to allow a communication apparatus of the MB-OFDM system to be informed of that, it is necessary to have uniformalized the frame formats of the DS-SS system and the MB-OFDM system.

(4) Other Embodiments (a) In the foregoing description, the MB-OFDM system is a communication system that frequency-hops a plurality of bands to transmit a communication signal. However, even when the frequency hopping is not used, each of the foregoing embodiments are applicable. In other words, these embodiments can be applied to the case where one band is fixedly allocated to one communication session. In this case, all the preamble portion 11 can be correlatively detected. In addition, all the header portions 13 and 15 can be transmitted and received.

(b) In the foregoing description, the frequency shift circuit 33B3 is disposed on the immediately upstream stage of the rate converter 33B1. Alternatively, the frequency shift circuit 33B3 may be disposed on a downstream stage of the rate converter 33B1.

(c) In the foregoing description, two standardization ideas of the IEEE 802.15.3 were exemplified as ultra wide band communication systems. However, the conditions of all or each of bands are not limited to those description.

(d) In the foregoing description, the communication apparatuses are based on the ultra wide band communication system. However, the techniques of the foregoing embodiments of the present invention can be applied to other communication systems in addition to the ultra wide band communication system.

(e) In the foregoing description, the communication function is realized like hardware. Alternatively, the same function may be realized by firmware or software. The programs of the firmware or software are stored in an optical storage medium (an optical disc, a phologram medium, or the like), a magnetic recording medium (a hard disk or the like), or a semiconductor memory.

(f) The forgoing communication apparatuses include various apparatuses depending on the type of the products. Examples of the communication apparatuses are portable information terminals (a portable computer, a mobile phone, a portable game machine, an electronic book, and so forth), wireless LAN devices (a wireless router, a cordless handset, and an access point unit), a clock, a game machine, a computer, a video camera, a digital camera, a scanner, a printing apparatus, a picture reproducing apparatus (for example, an optical disc apparatus and a home server), a monitor, a television receiver, and a processing board and a processing card in which functions of embodiments of the present invention are installed. Any type of communication apparatuses has as a common structure a casing, an antenna, and transmission and reception circuits. Peripheral devices depending on the types of the communication apparatuses are added to the common structure. When the communication apparatus is a portable information terminal, in addition to the common structure, the apparatus has an operation and input section, a display section, and another user interface. When the communication apparatus is a video camera or a digital camera, in addition to the common structure, the apparatus has a camera unit and a write circuit that stores photographed picture data to a recording medium.

(g) It should be understood by those skilled in the art that various modifications, combinations, sub-combinations and alternations may occur depending on design requirements and other factors insofar as they are within the scope of the appended claims or the equivalents thereof.

What is claimed is:

1. A communication apparatus, comprising:
a despreading section configured to despread a reception signal with a spreading code defined in one communication system;
a decoding section configured to decode the reception signal despread by the despreading section;
a first occupation detection section configured to correlatively detect an occupation state of a communication band using a preamble code defined in the one communication system; and
a second occupation detection section configured to correlatively detect an occupation state of a communication band of a signal of another communication system having a chip rate different from that of the one communication system by converting an over-sampled signal of the another communication system into a symbol rate corresponding to the one communication system and using a preamble code defined in the another communication system.

2. The communication apparatus according to claim 1, further comprising:
a communication control section configured to stop communication of the local station if the occupation state of the communication band occupied by the another communication system is detected by the second occupation detection section.

3. The communication apparatus according to claim 1, wherein the second occupation detection section comprises:
a spread symbol storing section configured to store a preamble code defined in the another communication system; and
a correlative calculation section configured to correlatively detect the occupation state of the communication band occupied by the signal of the another communication system.

4. The communication apparatus according to claim 3, further comprising:
a frequency shifting section configured to match a center frequency of an interference wave with a center frequency of a local station.

5. The communication apparatus according to claim 1, wherein the one communication system is a direct spread spectrum spread system that uses one communication band selected from a plurality of usable communication bands; and
the another communication system is an orthogonal frequency division multiplex system.

6. The communication apparatus according to claim 1, wherein the second occupation detection section comprises:
a header information demodulation section configured to demodulate header information of a communication signal of the another communication system;
a preamble generating section configured to generate a preamble portion of a communication signal of the another communication system; and
a header information generating section configured to generate header information of a communication signal of the another communication system.

7. A communication method, comprising:
despreading a reception signal with a spreading code defined in one communication system;
decoding the reception signal despread by the despreading process; and
correlatively detecting an occupation state of a communication band using a preamble code defined in the one communication system; and
correlatively detecting an occupation state of a communication band of a signal of another communication system having a chip rate different from that of the one communication system by converting an over-sampled signal of the another communication system into a symbol rate corresponding to the one communication system and using a preamble code defined in the another communication system.

8. The communication method according to claim 7, further comprising:
stopping communication of a local station if the occupation state of the communication band occupied by the another communication system is detected.

9. The communication method according to claim 7, further comprising:
storing a preamble code defined in the another communication system; and
correlatively detecting the occupation state of the communication band occupied by the signal of the another communication system using the preamble code.

10. The communication method according to claim 7, wherein the one communication system is a direct spread spectrum spread system that uses one communication band selected from a plurality of usable communication bands; and
the another communication system is an orthogonal frequency division multiplex system.

11. The communication method according to claim 7, further comprising:
demodulating header information of a communication signal of the another communication system;
generating a preamble portion of a communication signal of the another communication system; and
generating header information of a communication signal of the another communication system.

12. A program stored in a non-transitory computer readable medium to be executed by a computer mounted on a communication apparatus, comprising:
despreading a reception signal with a spreading code defined in one communication system;
decoding the reception signal despread by the despreading process;
correlatively detecting an occupation state of a communication band using a preamble code defined in the one communication system; and correlatively detecting an occupation state of a communication band of a signal of another communication system having a chip rate different from that of the one communication system by converting an over-sampled signal of the another communication system into a symbol rate corresponding to the one communication system and using a preamble code defined in the another communication system.

13. The program stored in a non-transitory computer readable medium according to claim 12, further comprising:
   storing a preamble code defined in the another communication system; and
   correlatively detecting the occupation state of the communication band occupied by the signal of the another communication system using the preamble code.

14. The program stored in a non-transitory computer readable medium according to claim 12,
   wherein the one communication system is a direct spread spectrum spread system that uses one communication band selected from a plurality of usable communication bands, and
   the another communication system is an orthogonal frequency division multiplex system.

15. The program stored in a non-transitory computer readable medium according to claim 12, further comprising:
   demodulating header information of a communication signal of the another communication system;
   generating a preamble portion of a communication signal of the another communication system; and
   generating header information of a communication signal of the another communication system.

* * * * *